(12) United States Patent
Zottmann

(10) Patent No.: US 8,131,149 B2
(45) Date of Patent: Mar. 6, 2012

(54) OPTICAL ROUTING DEVICE AND OPTICAL NETWORK USING SAME

(75) Inventor: Harald Zottmann, Kleinostheim (DE)

(73) Assignee: Ciena Corporation, Linthicum, MD (US)

( * ) Notice: Subject to any disclaimer, the term of this patent is extended or adjusted under 35 U.S.C. 154(b) by 436 days.

(21) Appl. No.: 12/436,470

(22) Filed: May 6, 2009

(65) Prior Publication Data

US 2010/0284691 A1 Nov. 11, 2010

(51) Int. Cl.
*H04J 14/00* (2006.01)
(52) U.S. Cl. ............ 398/49; 398/50; 398/48; 398/45
(58) Field of Classification Search ........... 398/49, 398/50, 48, 45
See application file for complete search history.

(56) References Cited

U.S. PATENT DOCUMENTS

| 5,285,449 | A * | 2/1994 | Georgiou | 370/360 |
| 6,480,309 | B1 * | 11/2002 | Lee et al. | 398/45 |
| 2006/0153496 | A1 * | 7/2006 | Tanobe et al. | 385/24 |

OTHER PUBLICATIONS

Sun, H. et al., Real-time measurement of 40Gb/s coherent system, Optics Express, vol. 16, No. 2, Jan. 21, 2008.
Nelson, L. E., et al., Performance of a 46-Gbps Dual-Polarization QPSK Transceiver in a High-PDM Fiber Transmission Experiment, Conference Paper, Optical Fiber Communication Conference (OFC), San Diego, California, Feb. 24, 2008.

* cited by examiner

*Primary Examiner* — Kinam Park
(74) *Attorney, Agent, or Firm* — Clements Bernard PLLC; Christopher L. Bernard; Lawrence A. Baratta, Jr.

(57) ABSTRACT

The invention pertains to methods, apparatus, and systems optical of networking using tunable receivers, optical blocking elements selectively placed in the network, and optical routing elements comprised of passive elements, such as optical couplers and splitters. The routing elements have a plurality of ports and comprise passive elements such as couplers and splitters configured so that input light received at any port of the element is output from each of the other ports of the element, but not at port at which it was input.

20 Claims, 6 Drawing Sheets

OPTICAL ROUTING DEVICE AND OPTICAL NETWORK USING SAME

FIELD OF THE INVENTION

The invention pertains to optical networks. More particularly, the invention pertains to techniques and apparatus for implementing optical networks using inexpensive routing components, such as splitters and couplers, rather than more complicated and expensive equipment, such as reconfigurable optical add-drop multiplexers (ROADMs) or optical cross-connects (OXCs).

BACKGROUND OF THE INVENTION

Optical networks are becoming increasingly common because of the extremely wide bandwidth that can be supported by optical transmission techniques. Many, if not most, optical networks utilize wavelength division multiplexing (WDM) or dense wavelength division multiplexing (DWDM) in order to maximize the amount of information that can be transported over the network per unit time (i.e., data bandwidth). Like all information networks, switching or routing devices are provided in the network to direct signals between nodes of the network to assure that information originated at a first node (e.g., a server node) and intended for a second node (e.g., a client node) is routed through the network from the first node to the intended second node. Switching and routing of signals on optical networks is commonly achieved using filters and optical routing components such as, fixed optical add-drop multiplexers (fixed OADMs), reconfigurable optical add/drop multiplexers (ROADMs), and/or optical cross-connectors (OXCs). These types of routing devices, particularly ROADMs, are popular because they are extremely flexible in routing ability. However, they are relatively expensive because, among other reasons, they are relatively complex and incorporate active optical elements.

Furthermore, it is difficult to alter a network after it has been set up using such components. For instance, there are several standard wavelength grids in common use in DWDM optical networks, including 200 GHz, 100 GHz and 50 GHz grids. Each of these standards defines a grid of wavelengths for DWDM within a portion of the visible light spectrum (e.g., C band). For instance, the 200 GHz grid defines a grid of 22 wavelengths for DWDM at spacings of 200 GHz in C band, the 100 GHz grid defines a grid of 44 wavelengths for DWDM at spacings of 100 GHz in C band, and the 50 GHz grid defines a grid of 88 wavelengths for DWDM at spacings of 50 GHz in C band. As technology improves, the wavelengths on which different data signals may be transported are likely to become increasingly densely packed. It is envisioned that wavelength density in DWDM optical networks will continue to increase and that practical networks soon will be able to be implemented with 25 GHz and even denser spacing.

Fixed OADMs have a colored structure, wherein each port is associated with a particular wavelength. Therefore, to change the wavelengths used in an existing network built using fixed OADMs would potentially require replacement of some or all of the fixed OADMs in the network, which is an expensive proposition to the point of being impractical in many cases. ROADMs, on the other hand, can be reconfigured remotely to alter their wavelength characteristics to work with different wavelengths. However, ROADMs have a banded structure, meaning that, while each port can be reconfigured to any wavelength, the wavelength spacing is still fixed. Thus, a change in the grid spacing in a ROADM-based network would require replacement of all of the ROADMs.

Furthermore, even if only the wavelengths, but not the spacings, are to be altered in a network built with ROADMs, very detailed planning is required.

Even further, ROADMs employ a channel filter for each wavelength/port. These channel filters introduce loss and signal distortion, thus limiting the number of ROADMs that a signal may pass through before it is too attenuated and/or distorted to be adequately detected at a receiver.

Nortel Networks has developed an optical networking platform that relies on coherent detection of specific wavelengths in which receivers on the network are able to tune into particular frequencies without the need for optical filters. Accordingly, a fiber in a DWDM network bearing different signals on different wavelengths can be coupled directly to a receiver employing coherent detection, and the receiver is able to pick out data on a particular wavelength without the need for a channel filter.

For further explanation of coherent detection and, particularly, the proprietary coherent detection scheme developed by Nortel Networks, reference can be had to an number of resources, such as Sun, H. et al, Real-time measurement of a 40 Gb/s coherent system, Optics Express, Vol. 16 No. 2, Jan. 21, 2008 and Nelson, L. E. et al., *Performance of a 46-Gbps dual-polarization QPSK*, Conference Paper, Optical Fiber Communication Conference (OFC), San Diego, Calif., Feb. 24, 2008.

SUMMARY OF THE INVENTION

The invention pertains to methods, apparatus, and systems for optical networking using tunable receivers (such as receivers employing coherent detection or tunable filters or a combination thereof), optical blocking elements, and routing elements comprised of passive elements (such as optical couplers and splitters). The routing elements, herein termed optical multicast routing elements, have a plurality of ports and comprise passive elements such as couplers and splitters configured so that input light received at any port of the element is output from each of the other ports of the element, but not at the port at which it was input.

By employing optical multicast routing elements and optical blocking elements selectively placed within the network fabric so as to preclude any optical loops in the network or more than one optical path between any two nodes of the network, a network can be constructed without the use of any ROADMs, fixed OADMs, OXCs, or the like.

Even further, network restoration in the event of fiber failure in any path of the network can be accomplished simply by reconfiguring the optical blocking elements in the network.

DETAILED DESCRIPTION OF THE PREFERRED EMBODIMENT(S)

Figure 1:
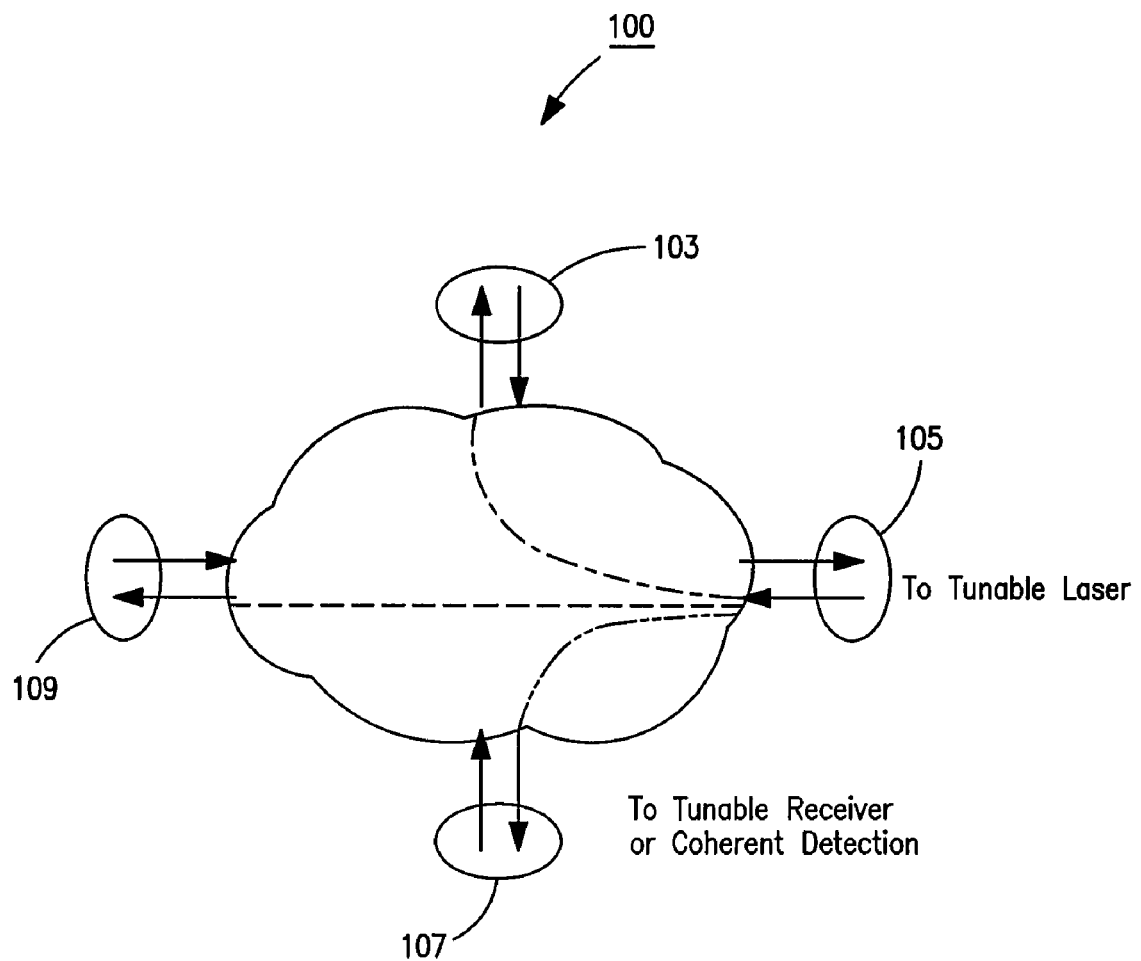
FIG. 1 is a high-level diagram illustrating an optical multicast routing element in accordance with the principles of the present invention.

FIG. 1 is a functional diagram illustrating the basic building block that may be used in accordance with this disclosure to build optical networks at low cost and with minimal design requirements. The element 100 is herein termed an optical multicast element. The optical multicast element 100 comprises a plurality of ports. In this example, the element has four ports 103, 105, 107, 109. However, this is merely exemplary and the element can have any number of ports. Each port is an input/output port. The optical multicast element 100 can accept an input signal at any port and will output that signal at each of the other ports. Thus, an input signal at port 105 is split and provided to each of the other output ports 103, 107, and 109. No portion of the signal returns to the same port.

While not shown in order not to unnecessarily obfuscate FIG. 1, a second input signal may be provided at port 103, which would be output at ports 105, 107, and 109, a third input signal may be provided at port 107, which would be output at ports 103, 105, and 109, and a fourth input signal may be provided at port 109, which would be output at ports 103, 105, and 107.

No wavelength filters or active elements are included in the optical multicast routing element 100. If each of the four signals introduced into the optical multicast routing element 100 has a different wavelength, a network may be constructed using nothing but optical multicast elements and selectively-placed optical blocking elements. A network built with routing elements 100 can support N different wavelengths, where N is the number of ports on the optical multicast routing elements (or at least the number of ports on the routing element having the fewest ports). While the optical multicast routing element can simultaneously handle up to N different wavelengths, each port may accept as input as many as N−1 different wavelength input signals and each port may output as many as N−1 different wavelength output signals.

Tunable receivers, such as receivers employing either coherent detection or tunable filters or a combination thereof, may be coupled to one or more of the ports of the optical multicast routing element 100 so as to receive only the information carried on one particular wavelength.

Figure 2:
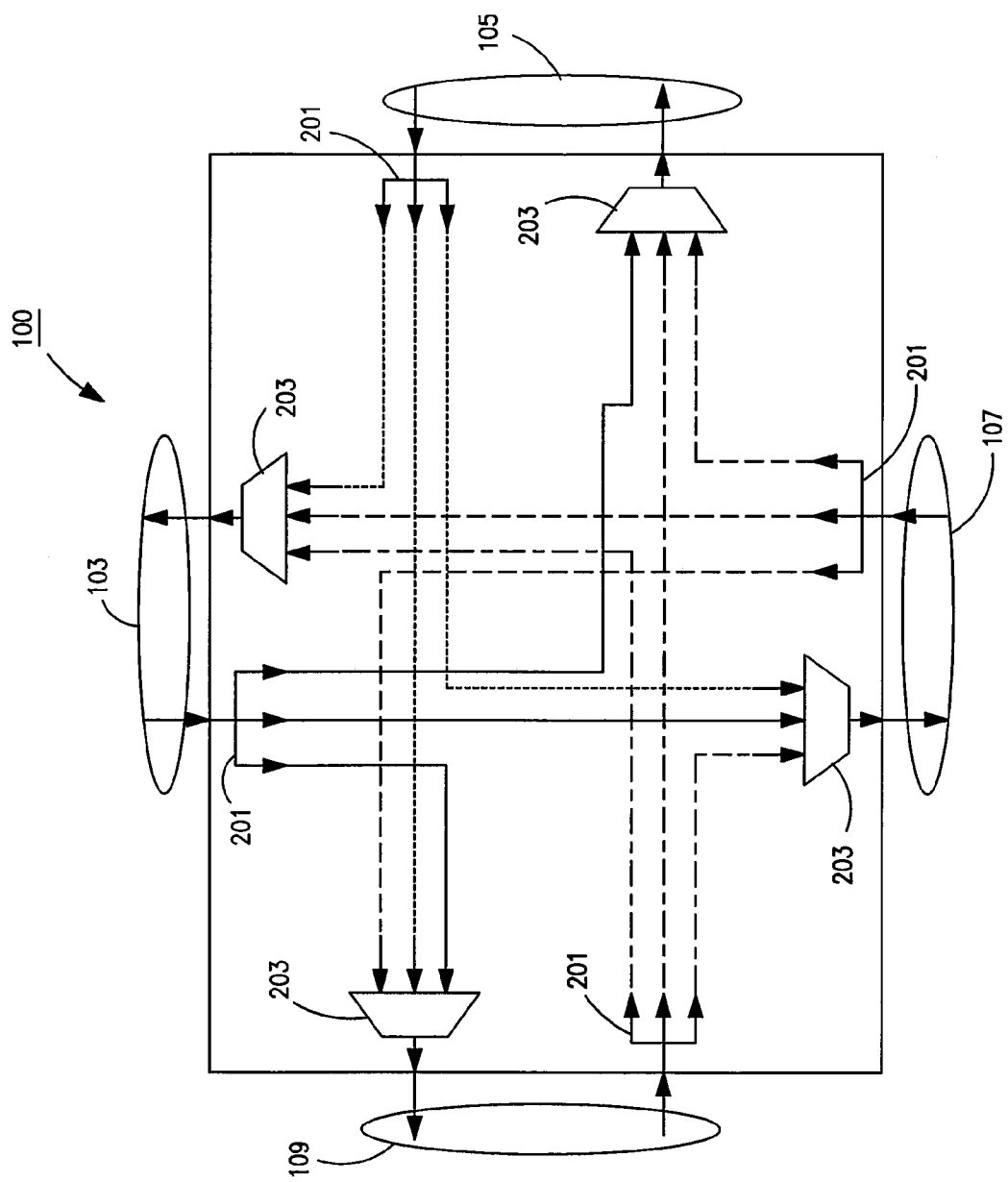
FIG. 2 is a more detailed diagram illustrating an exemplary embodiment of the optical multicast routing element of FIG. 1.

FIG. 2 shows one exemplary implementation of optical multicast routing element 100 in FIG. 1. As can be seen, the element 100 may be composed entirely of passive, colorless, and bandless optical elements, such as couplers and splitters. Specifically, each port 103, 105, 107, 109 includes a splitter 201 for taking any input signal, splitting it, and sending it to each of the three other ports of the element 100. Each port further includes a coupler 203 that combines the signals from each of the three other ports and presents them at the corresponding port.

The power of each output signal is approximately 1(N−1) times the power of the input signal as a result of the splitting (assuming lossless splitters and couplers). In actuality, the output power may be slightly lower due to the fact that there may be some losses in the optical elements. Thus, in the illustrated exemplary four-port embodiment, each input signal is split three ways such that the power of the output signal is about a third of the power of the input signal. This reduction in power is roughly equivalent to about a 5 dB drop in signal strength per four-port optical multicast routing element and only 3 dB per three-port optical multicast routing element. This compares favorably to the 7-11 dB drop that is typical of ROADMs. Further, generally speaking, assuming typical powers used in optical communication networks, a drop in optical power of about 30 dB is tolerable before a signal becomes too weak for reception. Hence, in a practical embodiment, a signal typically should be able to travel through at least 5 or 6 and possibly as many as 9 or 10 four-port optical multicast routing elements 100 before the use of an amplifier or repeater would be required. Therefore, in a network built with these optical multicast routing elements, the largest permissible number of optical multicast routing elements between two nodes typically would be about 5-6, but possibly as many as 9 or 10 before amplifiers would become necessary in the network fabric.

Increasing the number of ports on the optical multicast routing elements 100 will increase the power loss per element and, hence decrease the number of those elements that a signal may traverse before requiring amplification, and vice versa.

Each port of the optical multicast routing element 100 may serve as a local add/drop for channels or as a network routing element coupled to further optical multicast routing elements.

Since these optical multicast routing elements may comprise only passive, colorless, and bandless elements, they can be used to build networks quickly and inexpensively.

Figure 3:
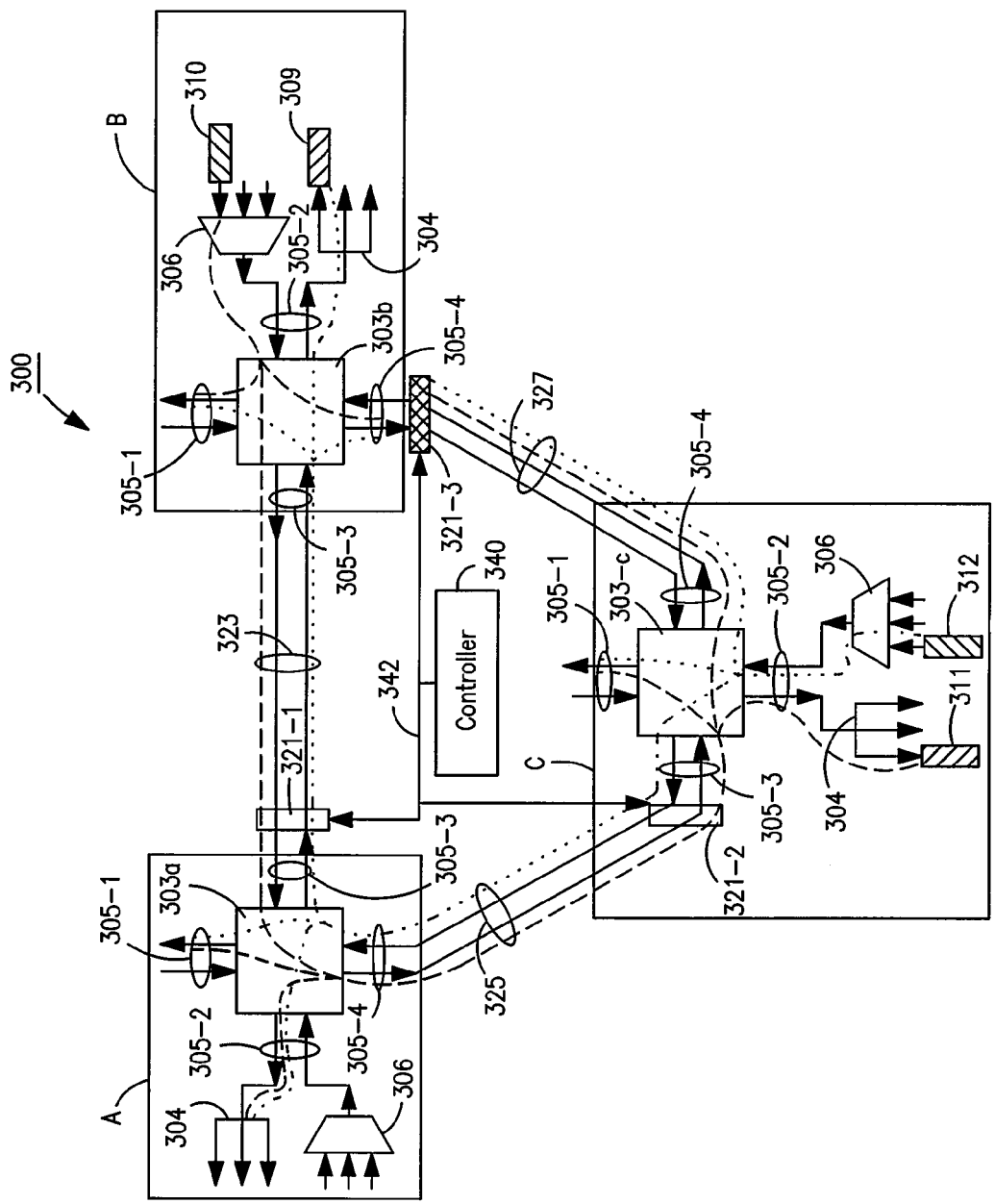
FIG. 3 is a diagram of an exemplary three-node network illustrating point-to-point bidirectional connectivity between two nodes using one wavelength channel in accordance with the principles of the present invention.

In order to illustrate the use of the optical multicast routing elements 100 shown in FIG. 2 in a network, FIG. 3 shows a very small network 300 comprising three nodes A, B, and C. Each node includes a four-port optical multicast routing element 303a, 303b, 303c, respectively, like the optical multicast routing element 100 of FIGS. 1 and 2. In this example, one of the four ports 305-1 in each routing element is unused. Another of the four ports 305-2 in each element is coupled to the node transmitter and receiver (if any). FIG. 3 illustrates, for instance, one tunable receiver 309 and one transmitter (e.g., tunable laser) 310 at node B and one tunable receiver 311 and one tunable transmitter 312 at node C. Node A has no local transmitter or receiver and essentially acts as a router on the network.

As shown, if it is desirable to have more than one receiver at a node, a splitter 304 may be coupled between the relevant port and the tunable receiver(s) and, if it is desirable to have more than one transmitter at a node, a coupler 306 may be coupled between the transmitter and the relevant port.

The other two ports of each element 303a-303c are used to interconnect that node with the other two nodes. Thus, port 305-3 of element 303a is coupled via optical fiber 323 to port 305-3 of element 303b, port 305-4 of element 303a is coupled via optical fiber 325 to port 305-3 of element 303c, and port 305-4 of element 303c is coupled via optical fiber 327 to port 305-4 of element 303b.

An optical blocking element, such as an optical ON/OFF switch is positioned somewhere in each optical path between nodes. Thus, for example, optical ON/OFF switch 321-1 is positioned along optical fiber 323 between nodes A and B, ON/OFF switch 321-2 is positioned along optical fiber 325 between nodes A and C and ON/OFF switch 321-3 is positioned along optical fiber 327 between nodes B and C.

The purpose of the ON/OFF switches is two-fold, namely to preclude loops and multiple paths in the network and to provide for network restoration. Particularly, with respect to the first purpose, the network topology should be designed so that (a) there is one and only one optical path from any node to any other node and (b) there are no loops in the network, i.e., there is no available path from any node back to the same node. This is termed a network tree structure, as is well known in the field of Ethernet networks. The term optical spanning tree will be used in this specification for this concept of using optical blocking elements to assure a tree network structure as opposed to a loop network structure.

Of course, in this simple example, this could have been achieved without the use of any ON/OFF switches, by simply removing the fiber 327 between node B and node C, or at least with only one ON/OFF switch in the entire network placed between any pair of the three nodes.

Nevertheless, it is preferable to have an optical blocking element in more than one fiber path, and, in fact, in each fiber path between two nodes for a second reason relating to the above-mentioned second purpose of the optical blocking elements, i.e., network restoration. Particularly, when a fiber in the network fails, if there are optical blocking elements available in multiple paths in the network, full network connectivity can be restored while maintaining the network tree structure simply by changing which optical blocking elements are turned on or off. Thus, for instance, if the fiber 323 between nodes A and B were to fail, full network restoration can be achieved while still maintaining the tree structure in which there are no loops in the network and no nodes are optically connected via more than one optical path by switching on ON/OFF switch 321-3 in optical fiber 327 and ON/OFF switch 321-2 in optical fiber 325. For good measure, it would be advisable to also turn the ON/OFF switch 321-1 in optical fiber 323 off to prevent the formation of a loop in the network should fiber 323 repair itself or otherwise become functional again.

The optical blocking elements need not be placed in the fiber per se. In fact, it would be more practical in most situations for the optical blocking element to be directly built into the optical multicast element 303. In one practical embodiment, an optical blocking element may be placed in one of the ports in each optical multicast element. However, even greater flexibility might be achieved by placing optical blocking elements in more than one of the ports.

It should further be noted that, depending on network topology, full network restoration in the event of a failure of any fiber may not necessarily require an optical blocking element in each path between two nodes. Nevertheless, as a practical matter, it would probably be most efficient from a manufacturing standpoint, if not also a design standpoint, to create all optical multicast routing elements for a given network exactly the same and, particularly, with an optical blocking element built into at least one port of each element.

A link control protocol may run on the nodes of the network to detect the topology of the network and control the optical blocking elements to assure that there are no loops in the network or multiple paths between any two nodes of the network. Alternatively, a separate controller, such as controller 340, may control the optical blocking element over a separate control channel 342.

Let us now consider data transmission in this exemplary network. This example illustrates a single, bidirectional point-to-point connection between nodes B and C through node A. It can be seen that the light (represented by the dashed lines in FIG. 3) output by laser 310 in node B is input to element 303b via its port 305-2. That light is output from all other ports 305-1, 305-3, and 305-4 of element 303b. Port 305-1 of element 303b is unused. The light output at port 305-3 of element 303b travels to port 305-3 of element 303a at node A via fiber 323. The light output at port 305-4 of element 303b is blocked by optical ON/OFF switch 321-1 and is essentially unused. At node A, the light from port 303b enters the element 303a via port 305-3 and exits through each of the other ports 305-1, 305-2, and 305-4. The light output at port 305-1 of element 303a is unused. The light output at port 305-2 of element 303a also is unused inasmuch as node A does not have any node equipment, but essentially acts as a router on the network. (This exemplary network is highly simplified and may not be a practical network implementation. For instance, there normally would be no need for a network router node such as node A in a network that has only two other nodes).

Finally, the light from laser 310 of node B also exits node A through port 305-4 of element 303a and travels over fiber 325 to port 305-3 of element 303c at node C. At element 303c, the light exits from each of the three other ports, 305-1, 305-2, and 305-4. Port 305-1 is unused. Port 305-2 is coupled to the node equipment, including tunable receiver 311 and tunable transmit laser 312. Tunable receiver 311 is tuned to receive light of the wavelength of laser 310. Finally, the light also exits element 303c through its port 305-4 onto fiber 327. However, since blocking element 321-3 in fiber 327 is configured to block light on fiber 327, the light never reaches port 305-4 of element 303b. Thus, in essence, port 305-4 of element 303c (as well as port 305-4 of element 303b in node B) is unused.

In the opposite direction of this bidirectional link between nodes B and C, tunable laser 312 in node C is tuned to output light of the same wavelength as laser 310 in node B. However, laser 312 could be tuned to a different wavelength, if desired. In fact, if it is desired to provide one-to-one transponder redundancy in the event that a laser or receiver fails, then use of different wavelengths for each direction of a link would be a requisite. Although, light of laser 312 is the same wavelength as the light from laser 310, it is shown in FIG. 3 by a dotted line, rather than a dashed line so that it can be distinguished from the light of laser 310.

The light from laser 312 enters element 303c through port 305-2 and exits through the other three ports. As previously noted, ports 305-1 and 305-4 of element 303c are essentially unused. However, the light output from port 305-3 travels over fiber 325 into port 305-4 of element 303a in node A.

As previously noted, ports 305-1 and 305-2 of element 303a are unused. However, the light from laser 312 that exits element 303a via its port 305-3 travels over fiber 323 into port 305-3 of element 303b in node B. Again, that light is output from each of the three other ports of element 303b. Ports 305-1 and 305-4 of element 303b are essentially unused. Thus, only the light output from port 305-2 is relevant and it is input to tunable receiver 309 in node B.

Thus, it can be seen that nodes B and C communicate with each other bidirectionally through node A and that this is the only path between node B and node C.

A notable characteristic of this optical multicast network is that there is no closed optical loop from any node back to the same node. Accordingly, the signal transmitted from any node cannot return to that node to interfere with other data being received on that same wavelength (e.g., from the other node in a bidirectional point-to-point link). Furthermore, there is only one optical path from any given node to any other given node. Thus, assuring that a single node cannot receive the same data from another node via two different paths, which data would interfere with each other. Also, all of the components of the network fabric, e.g., the optical multicast elements and the optical blocking elements, are colorless and bandless (i.e., have no restrictions in terms of the wavelengths or wavelength spacings that they can handle). In addition, the tunable lasers and tunable receivers in the various termination nodes may be tuned to any wavelength it is desired to detect. Furthermore, any given node can be configured to transmit or receive on any or all of the wavelengths in the network.

Each point-to-point communication between two nodes is carried out over a unique wavelength in the optical multicast network (although it also is possible to use two different wavelengths). The network fabric may be built comprised entirely of optical fibers and passive optical elements (and thus, can be built inexpensively).

The network can support any color of light at any frequency spacing intervals. It can support virtual fiber services and flexible bandwidth services. It allows the narrowing of the channel spacing below the ITU-T grid specifications, thereby enabling greater spectral efficiency without the need to replace any hardware in the network. Furthermore, the network has none of the signal distortion that is inherent in networks built with ROADMs with filter curves. The network does not require channel filters, which attenuate the signals. The network supports amplification, as needed, but generally will not require amplification where the number of nodes is small, e.g., below 5 or 6 or possibly even 9 or 10.

Communication links can be point-to-point or point-to-multipoint. Accordingly, optical multicast networks would be particularly suitable for video distribution, for example. Each wavelength can support exactly one point-to-point or point-to-multipoint bidirectional connection per optical multicast network. Finally, one-to-one transponder protection also can be provided in an optical multicast network, but requires two distinct wavelengths (one wavelength for each connection).

The optical multicast network disclosed herein is probably best-suited for smaller networks with less than about 20 to 30 nodes because of the limits on the number of wavelength channels supportable. Accordingly, it is particularly suited for data center, campus, metro, regional, and core networks, which commonly have a relatively limited number of nodes.

Figure 4:
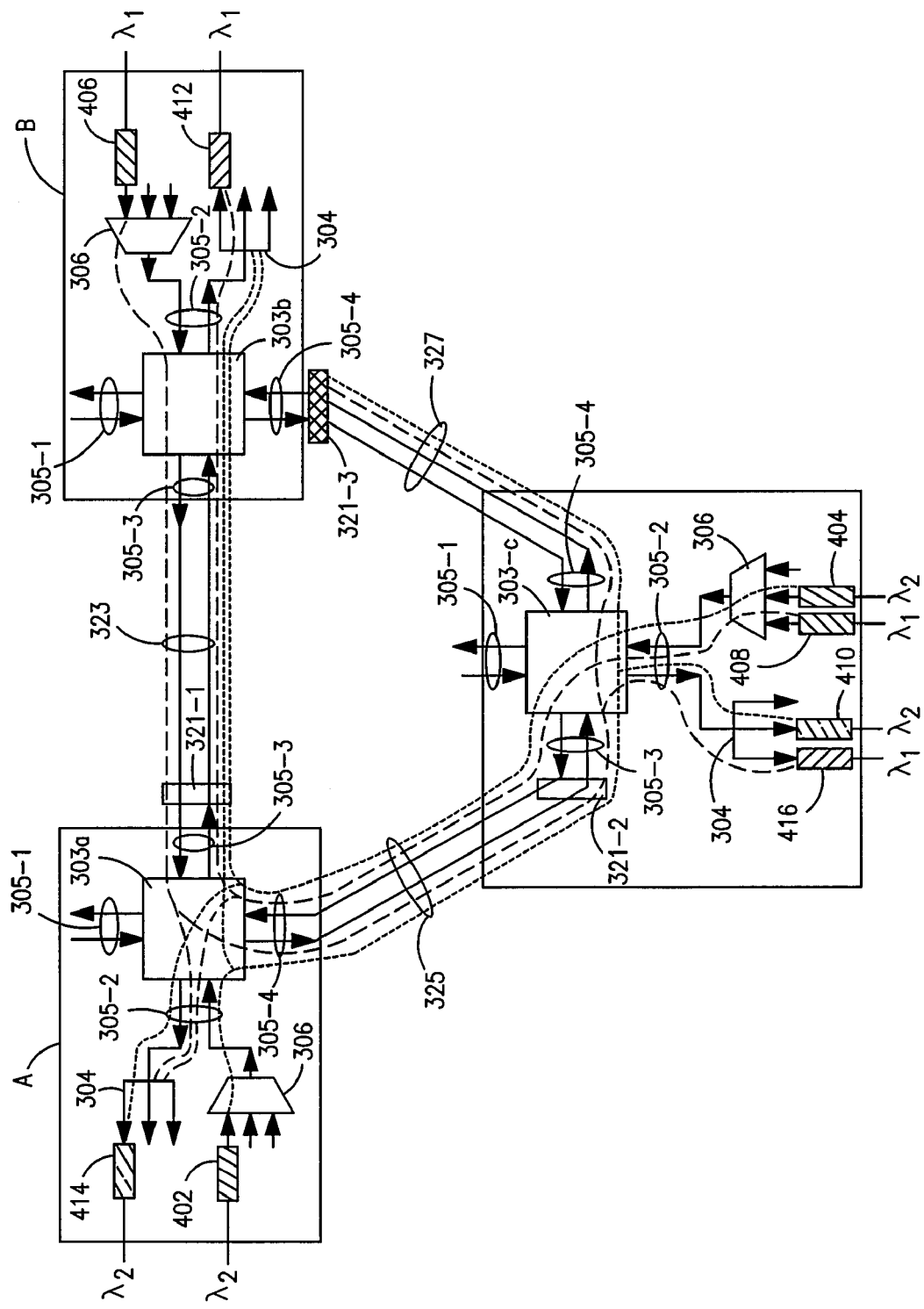
FIG. 4 is a diagram illustrating the three-node network of FIG. 3 with bidirectional point-to-point connectivity with two wavelength channels in accordance with the principles of the present invention.

FIG. 4 is a diagram illustrating a three-node optical multicast network similar in structure to the network of FIG. 3, but having two open point-to-point communication channels, rather than one. In this diagram, light beams of the same wavelength are represented by the same type of line (e.g., dashed line or dotted line). This figure helps further illustrate the flexibility of the network and, particularly, a few of the aspects discussed above. For instance, FIG. 4 illustrates overlapping communication links on different wavelengths. Specifically, the two communication links in this example are a point-to-point link between node B and node C through node A (between laser 406 and receiver 416 in the B to C direction and between laser 408 and receiver 412 in the C to B direction) on a first wavelength λ1 (dashed line) and a point-to-point link between node A and node C (between laser 402 and receiver 410 in the A to C direction and between laser 404 and receiver 414 in the C to A direction) on the second wavelength λ2 (dotted line). This diagram also helps further illustrate how the optical blocking element 321-3 prevents the light generated at node A that is intended for node B from reaching node B via more than one possible path. Specifically, note that signals from laser 402 at node A at wavelength λ2 (dotted line) travel toward node B via two paths, namely, (1) from laser 402 into port 305-2 of element 303a, out port 305-3 of element 303a, over optical fiber 323, into port 305-3 of element 303b, out port 305-2 of element 303b, and through splitter 304 into tunable receiver 412 at node B and (2) from laser 402 into port 305-2 of element 303a, out port 305-4 of element 303a, over optical fiber 325, into port 305-3 of element 303c, and out port 305-4 of element 303c where it is stopped by optical blocking element 321-3. Without optical blocking element 321-3, the signal would have entered element 303b of node B through its port 305-4, passed through the element 303b and out port 305-2 of element 303b and into tunable receiver 412 at node B, where it would interfere with the same signal as received by the tunable receiver 412 via the first path note above.

Without describing each light path in detail, it should be apparent from a tracing of the various signal lines that the blocking element 321-3 also blocks the other three signals (i.e., (1) the output of laser 404 at node C (also at wavelength λ2, (2) the output of laser 406 at node B (at wavelength λ1), and (3) the output of laser 408 at node C (at wavelength λ1)) from returning to the node from which they originated (no loops in the network) or from reaching any other node via more than one optical path.

The placement of the optical blocking element is independent of the traffic/service matrix, but depends only on the physical topology of the network.

As previously mentioned, each link between two nodes must be on its own unique wavelength channel (or two unique wavelengths). For instance, if it were necessary to add a communication link between node A and node B, that would be possible using a third wavelength. If that link were to use, for instance, the same wavelength λ1, as the link between node B and node C (the dashed line), then it would cause interference at node B because tunable receiver 412 would be tuned to the second wavelength and therefore would receive the signals from both laser 404 at node C and the signals from the same wavelength laser at node A. On the other hand, a third wavelength would cause no such problems because tunable receiver 404 would ignore signals at any wavelength other than wavelength λ2, to which it is tuned for purposes of communicating with node C.

Figure 5:
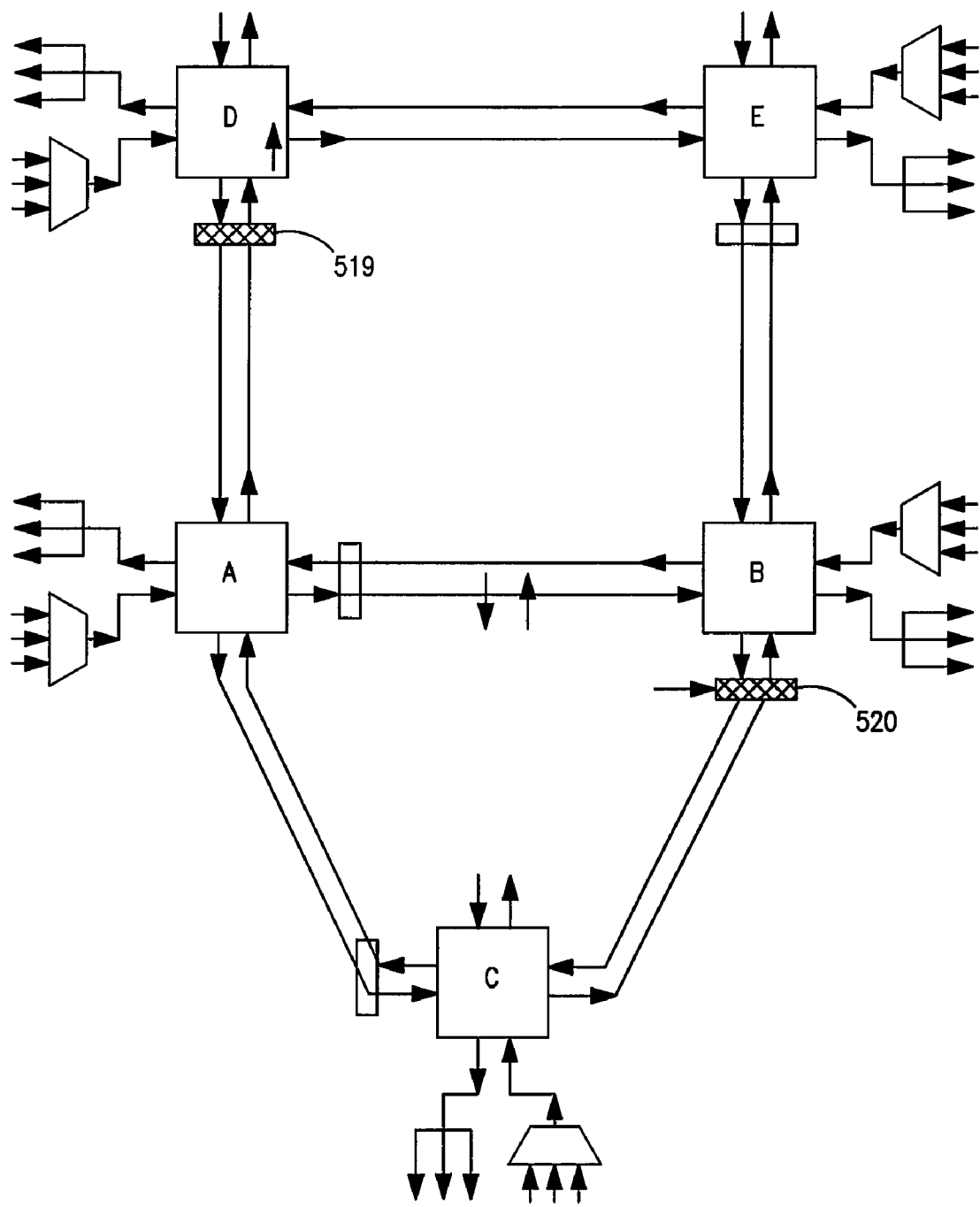
FIG. 5 is a diagram illustrating a five-node network that helps illustrate the use of optical blocking elements in the network in accordance with the principles of the present invention.

In a network with only three nodes (as well as any network with more than three nodes in which the nodes are connected strictly in a ring configuration), only one optical blocking element is necessary. However, in networks with more than three nodes that are not interconnected in a strict ring configuration, more than one optical blocking element may be necessary. FIG. 5, for instance, illustrates an optical multicast network having five nodes A, B, C, D, and E. The network topology includes nodes that are directly connected to more than two adjacent nodes. For instance, node A is connected to node D, node B, and node C. Also, node B is connected to three nodes, namely, node A, node E, and node C. This network topology requires two blocking elements to assure the conditions that (1) there are no loops and (2) that there is only one path from any given node to any other given node. Thus, there are two optical blocking elements 519 and 520 placed in the path between nodes D and A and between nodes C and B, respectively, that guarantee these two conditions. Of course, this is merely one exemplary configuration for the optical blocking elements. The two optical blocking elements could have been placed in many other positions to achieve the same result (however, in this particular topology, two blocking elements would always be required).

While the invention has been described hereinabove in connection with optical multicast routing elements having four ports, this is merely exemplary. Optical multicast routing elements can have any number of ports. However, as the number of ports increases, the power attenuation through each optical multicast routing element increases. For instance, a five-port optical multicast routing element would have a 1:4 power drop between input and output ports, and a six-port optical multicast routing element would have a 1:5 power drop between input and output ports.

Ignoring losses in the fibers, etc. for the moment, the overall maximum power drop for a signal in the network is a function of (1) the largest possible number of optical multicast routing elements that a signal may traverse to travel from one node to another and (2) the number of ports per optical multicast routing element. The fewer the maximum number of optical multicast routing elements to be traversed, the greater the number of ports per optical multicast routing element that may be offered and vice versa.

However, measures may be taken to increase signal power in the network so as to allow a greater number of nodes in the network and/or a greater number of ports in the optical multicast routing elements than might otherwise be practical. For instance, the power drop may be reduced by incorporating micro-amplifiers in the optical splitters and/or optical couplers within the optical multicast routing elements. Alternately, amplifiers may be strategically placed in the network fabric to assure that no signal can pass through more than a predetermined number of optical multicast routing elements before passing through an amplifier.

The principles disclosed in this specification are best suited to optical networks having fewer than 30-40 nodes. Particularly, wavelengths cannot be reused in any one optical multicast network domain. A network constructed in accordance with these principles can support as many wavelengths as the number of ports in the optical multicast routing elements. Of course, multiple distinct signals may be carried by each wavelength carrier in accordance with well-known practices, such as polarization division multiplexing, TDM multiplexing, and/or L2/3 VPN services. Accordingly, the network has a defined number of simultaneous point-to-point or point-to-multipoint communication links that it can support. In short, because of the particular structure of the network, wavelengths cannot be re-used in the network. That is, a wavelength used in one point-to-point or point-to-multipoint communication link cannot be used simultaneously for any other communication link in the network.

Figure 6:
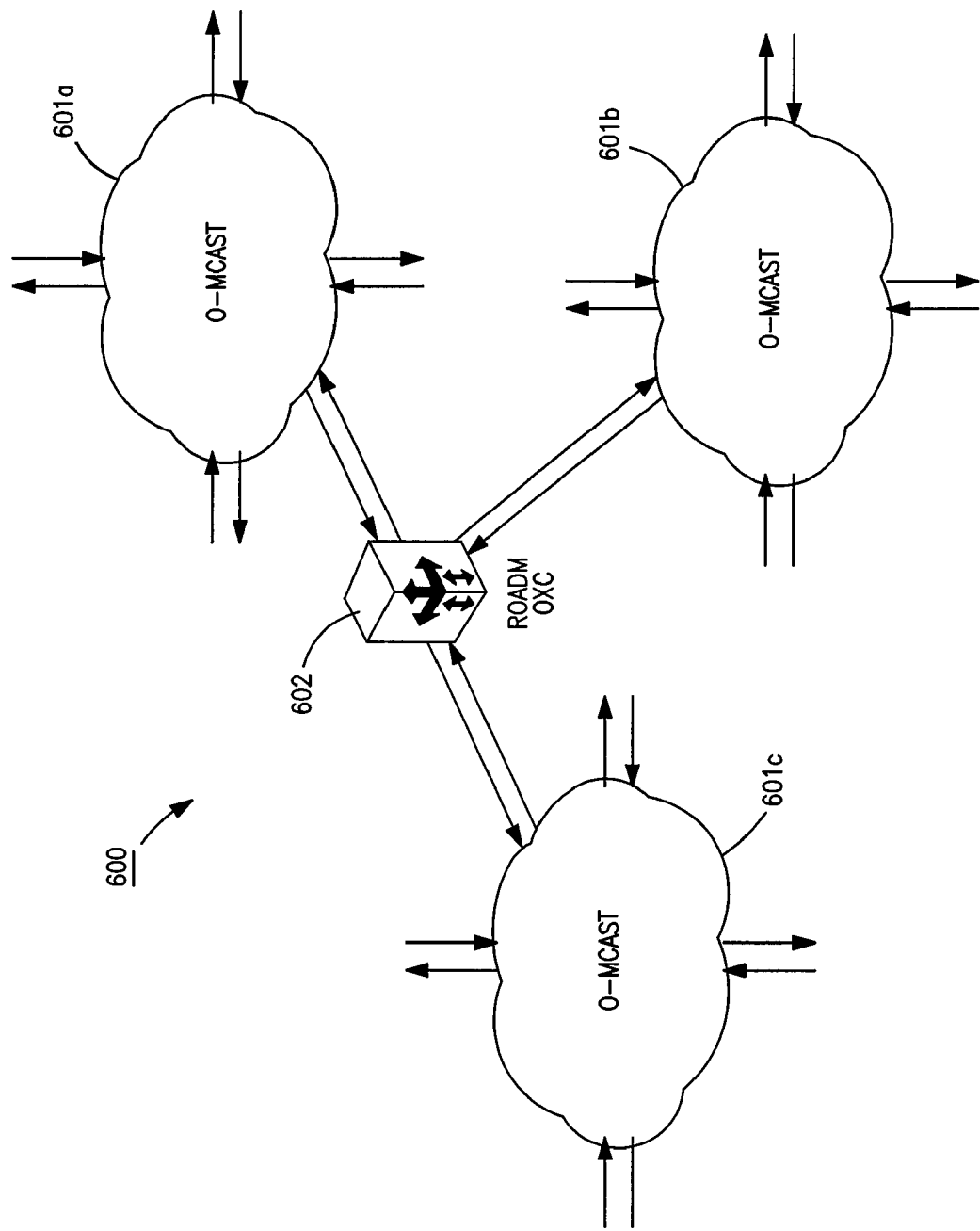
FIG. 6 is a diagram of a larger network comprising a plurality of smaller optical multicast networks interconnected through an active routing element such as a ROADM.

Nevertheless, a plurality of optical multicast network domains such as described hereinabove can be interconnected to each other using ROADMs, OXCs or other active optical routing elements that permit wavelength re-use to build an overall network of virtually any size. FIG. 6 illustrates such an embodiment. Particularly, a number of optical multicast network domains 601a, 601b, 601c can be interconnected by any optical add/drop device that permits re-use of wavelengths, such as ROADM or OXC 602 to create a larger overall network 600. Any node in any of the optical multicast network domains 601a, 601b, 601c may be connected to any other node in any of the optical multicast network domains 601a, 601b, 601c through any number of intervening optical multicast networks and ROADMs.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. An optical routing apparatus comprising:
   N input/output ports, wherein N is an integer greater than or equal to three;
   a first optical coupler associated with each input/output port, each first optical coupler having an output terminal coupled to the associated input/output port, and N−1 input terminals, each input terminal coupled to a different one of the input/output ports of the optical routing apparatus other than the associated input/output port;
   a first optical splitter associated with each input/output port, each first optical first splitter having an input terminal coupled to the associated input/output port, and N−1 output terminals, each output terminal coupled to a different one of the input/output ports of the optical routing apparatus other than the associated input/output port.

2. The optical routing apparatus of claim 1 further comprising:
   a second optical coupler associated with each input/output port, each second optical coupler having an output terminal coupled to the associated input/output port, and a plurality of input terminals;
   a second optical splitter associated with each input/output port, each second optical splitter having an input terminal coupled to the associated input/output port, and a plurality of output terminals.

3. The optical routing apparatus of claim 1 further comprising a configurable optical blocking element associated with at least one of the input/output ports, the optical blocking element configurable between a first state in which it prevents light from passing between the first optical splitter and first optical coupler of the associated input/output port, on the one hand, and an optical fiber coupled to that input/output port, on the other hand, and a second state in which it permits light to pass between the first optical splitter and first optical coupler, on the one hand, and an optical fiber coupled to that input/output port, on the other hand.

4. The optical routing apparatus of claim 3 wherein the optical blocking element comprises an optical ON/OFF switch.

5. The optical routing apparatus of claim 1 further comprising a configurable optical blocking element associated with each of the input/output ports, the optical blocking elements configurable between a first state in which it prevents light from passing between the first optical splitter and first optical coupler of the associated input/output port, on the one hand, and an optical fiber coupled to that input/output port, on the other hand, and a second state in which it permits light to pass between the first optical splitter and first optical coupler, on the one hand, and an optical fiber coupled to that input/output port, on the other hand.

6. An optical routing apparatus comprising N input/output ports, wherein N is an integer greater than or equal to three, the optical routing apparatus configured to direct light that is input to each of the input/output ports to all of the other input/output ports.

7. An optical communication network comprising:
   a first set of network nodes comprising a plurality of nodes, each node in the first set of nodes having associated therewith;
   at least one receiver;
   at least one transmitter; and
   an optical routing apparatus, the optical routing apparatus including N input/output ports, wherein N is an integer greater than or equal to three, a first optical coupler associated with each input/output port, each first optical coupler having an output terminal coupled to the associated input/output port, and N−1 input terminals, each input terminal coupled to a different one of the input/output ports of the optical routing apparatus other than the associated input/output port, and a first optical splitter associated with each input/output port, each first optical first splitter having an input terminal coupled to the associated input/output port, and N−1 output terminals, each output terminal coupled to a different one of the input/output ports of the optical routing apparatus other than the associated input/output port; and a plurality of optical fibers interconnecting the network nodes such that there is one path from any network node to any other network node and there are no loops in the network;

wherein a first input/output port of each optical routing apparatus is coupled to the receiver and the transmitter of the corresponding network node, a second input/output port of each optical routing apparatus is coupled to the optical routing apparatus corresponding to another network node.

8. The optical communication network of claim 7:

wherein a third input/output port of each optical routing apparatus is coupled to the optical routing apparatus corresponding to another network node different than the network node to which the second input/output port is coupled; and wherein the optical communication network further comprises at least one optical blocking element positioned in the network to assure that there is only one unblocked path from any network node to any other network node and there are no loops in the network.

9. The optical communication network of claim 8 wherein the at least one optical blocking element is configurable between a first state in which it prevents light from passing therethrough and a second state in which it permits light to pass therethrough.

10. The optical communication network of claim 9 further comprising:

a controller in the network adapted to collectively configure all of the optical blocking elements in the network to assure that there is only one unblocked path from any network node to any other network node and there are no loops in the network.

11. The optical communication network of claim 7 wherein the transmitters and the receivers are both wavelength tunable.

12. The optical communication network of claim 11 wherein the receivers are coherent receivers.

13. The optical communication network of claim 7 further comprising a second set of network nodes comprising at least one node, each node in the second set of nodes having associated therewith an optical routing apparatus, the optical routing apparatus including N input/output ports, wherein N is an integer greater than or equal to three, a first optical coupler associated with each input/output port, each first optical coupler having an output terminal coupled to the associated input/output port, and N−1 input terminals, each input terminal coupled to a different one of the input/output ports of the optical routing apparatus other than the associated input/output port, and a first optical splitter associated with each input/output port, each first optical first splitter having an input terminal coupled to the associated input/output port, and N−1 output terminals, each output terminal coupled to a different one of the input/output ports of the optical routing apparatus other than the associated input/output port.

14. The optical communication network of claim 7 wherein each communication link over the network may be one of point-to-point and point-to-multipoint and may be one of unidirectional and bidirectional.

15. The optical communication network of claim 14 wherein each communication link between any two nodes is established on a unique wavelength in the network.

16. The optical communication network of claim 15 wherein a plurality of communication channels exists in at least one of the unique wavelength links in the network.

17. A communication network comprising:

a plurality of the optical communication networks of claim 16 interconnected via at least one optical routing device that permits wavelength re-use between ports thereof.

18. The communication network of claim 17 wherein the at least one optical routing device comprises an optical add/drop multiplexer.

19. The communication network of claim 17 wherein the at least one optical routing device comprises a reconfigurable optical add/drop multiplexer.

20. The communication network of claim 17 wherein the at least one optical routing device comprises an optical cross-connector.

* * * * *